(12) United States Patent
Huang (10) Patent No.: US 12,140,177 B2
(45) Date of Patent: Nov. 12, 2024

(54) TUBE SET DEVICE AND CLAMPING ASSEMBLY

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 482 days.

(21) Appl. No.: 17/477,569

(22) Filed: Sep. 17, 2021

(65) Prior Publication Data

US 2022/0290707 A1 Sep. 15, 2022

Related U.S. Application Data

(60) Provisional application No. 63/159,399, filed on Mar. 10, 2021.

(30) Foreign Application Priority Data

Aug. 16, 2021 (TW) .................................. 110209652

(51) Int. Cl.
*F16B 7/14* (2006.01)
*F16M 11/28* (2006.01)

(52) U.S. Cl.
CPC ........... *F16B 7/1454* (2013.01); *F16M 11/28* (2013.01); *F16M 2200/027* (2013.01); *Y10T 403/32467* (2015.01); *Y10T 403/7071* (2015.01)

(58) Field of Classification Search
CPC .......... F16B 7/1454; Y10T 403/32467; Y10T 403/7071; F16M 11/28; F16M 2200/027
See application file for complete search history.

(56) References Cited

U.S. PATENT DOCUMENTS

| 5,295,933 | A | * | 3/1994 | Ciminski | A63B 21/0728 |
| | | | | | 403/17 |
| 6,948,878 | B1 | * | 9/2005 | Smith, Jr. | F16B 7/1418 |
| | | | | | 70/261 |
| 6,972,042 | B2 | * | 12/2005 | Benson | A61F 2/76 |
| | | | | | 403/DIG. 4 |
| 7,195,377 | B2 | * | 3/2007 | Tsai | F16M 11/245 |
| | | | | | 362/427 |
| 8,496,018 | B2 | * | 7/2013 | Lenhart | A63C 11/221 |
| | | | | | 280/823 |
| 8,608,118 | B2 | * | 12/2013 | Lai | F16B 7/1454 |
| | | | | | 403/374.5 |

FOREIGN PATENT DOCUMENTS

TW M393232 12/2010

* cited by examiner

*Primary Examiner* — Michael P Ferguson
(74) *Attorney, Agent, or Firm* — JCIPRNET (57) ABSTRACT

A tube set device includes first and second tubes and a clamping assembly. The first tube partially extending from an opening into the second tube is telescopic relative to the second tube. The clamping assembly disposed at the opening of the second tube includes a quick-release tube-clamp and a safety lock unit. The quick-release tube-clamp includes a tightening body and a handle. The handle pivoted on the tightening body is able to be switched pivotally between released and locked states. The safety lock unit includes a first matching element disposed on one of the handle and the tightening body and a second matching element disposed on the other one. In the locked state, the first matching element is aligned with the second matching element, and the first and second matching elements are assembled with each other to fix the handle on the tightening body and maintain the locked state.

11 Claims, 13 Drawing Sheets

TUBE SET DEVICE AND CLAMPING ASSEMBLY

CROSS-REFERENCE TO RELATED APPLICATION

This application claims the priority benefit of U.S. provisional application Ser. No. 63/159,399, filed on Mar. 10, 2021 and Taiwan application serial no. 110209652, filed on Aug. 16, 2021. The entirety of each of the above-mentioned patent applications is hereby incorporated by reference herein and made a part of this specification.

BACKGROUND

Technical Field

The disclosure relates to a device and an assembly, particularly to a tube set device and a clamping assembly.

Description of Related Art

A tube set device is used in various applications, such as a table or a chair that can be lowered and raised, or a shelf for hanging clothes. The tube set devices with tubes sleeved in each another achieve the purpose of adjusting the height of the desktop, chair, and shelf through the extension and retraction of the tube set.

Take the Taiwan patent with the reference No. M393232 for an example. It uses the mutual sleeving of a pneumatic rod and a riser to adjust the height of the desktop.

The part where the pneumatic rod protrudes from the riser can be locked into the fixing-seat body by the bolt of the fixing seat that presses against the pressing block, so that the pressing block is forced to press against the pneumatic rod to restrict the pneumatic rod and the riser from rotating, which stabilizes the positioning of the pneumatic rod and the riser.

However, when using bolts to lock the fixing-seat body, the fixing-seat body is likely to bear too much pressure from bolts that are locked too tight, causing the fixing-seat body to rupture.

Or, if the bolt is not locked properly into the fixing-seat body so that the force of the bolt pressing the pressing block is insufficient, the friction between the pressing block and the pneumatic rod cannot support the force used to restrict the pneumatic rod and the riser from rotating and to stabilize the positioning of the pneumatic rod and the riser, and it is easy for the user to cause the pneumatic rod to retract into the riser when accidentally applying force on the desk, causing the desktop to drop suddenly and putting the user at risk.

SUMMARY

The present disclosure provides a clamping assembly capable of properly fixing the tubes sleeved in one another.

The present disclosure provides a tube set device with safety in use.

A tube set device of the present disclosure includes a first tube and a second tube that are sleeved with each other and a clamping assembly. The second tube includes an opening, and the first tube partially extends from the opening into the second tube, and the first tube is telescopic relative to the second tube. The clamping assembly is disposed at the opening of the second tube, and the clamping assembly includes a quick-release tube-clamp and a safety lock unit. The quick-release tube-clamp includes a tightening body and a handle. The handle is pivoted on the tightening body and is able to be switched pivotally between a released state and a locked state. In the released state, the first tube is telescopic relative to the second tube. In the locked state, the tightening body clamps the first tube and the second tube tightly. The safety lock unit includes a first matching element and a second matching element. The first matching element is disposed on one of the handle and the tightening body, and the second matching element is disposed on the other one of the handle and the tightening body. In the locked state, the first matching member is aligned with the second matching member, and the first matching member and the second matching member are assembled with each other to fix the handle to the tightening body and maintain the locked state.

The clamping assembly of the disclosure is suitable for a first tube and a second tube that are sleeved with each other. The second tube includes an opening, and the first tube partially extends from the opening into the second tube, and the first tube is telescopic relative to the second tube. The clamping assembly is disposed at the opening of the second tube and includes a quick-release tube-clamp and a safety lock unit. The quick-release tube-clamp includes a tightening body and a handle. The handle is pivoted on the tightening body and is able to be switched pivotally between a released state and a locked state. In the released state, the first tube is telescopic relative to the second tube, and in the locked state, the tightening body clamps the first tube and the second tube tightly. The safety lock unit includes a first matching element and a second matching element. The first matching element is disposed on one of the handle and the tightening body, and the second matching element is disposed on the other one of the handle and the tightening body. In the locked state, the first matching member is aligned with the second matching member, and the first matching member and the second matching member are assembled with each other to fix the handle to the tightening body and maintain the locked state.

In an embodiment of the present disclosure, the first matching element is a safety screw, and the second matching element is a lock-hole element. The handle is fixed to the tightening body by screwing the safety screw into the lock-hole element.

In an embodiment of the present disclosure, the first matching member has a screw head, a shaft part, and a thread part. The shaft part is connected between the screw head and the thread part. The outer diameter of the thread part is larger than the outer diameter of the shaft part, whereby the first matching member is idlingly disposed on one of the handle and the tightening body.

In an embodiment of the present disclosure, the second matching member has a lock hole and a nut column fixed in the lock hole.

In an embodiment of the present disclosure, the tightening body has a C-shaped tube and a pair of wing plates extending outwardly from the C-shaped tube at an interval. The C-shaped tube has a notch, and the pair of the wing plates are correspondingly adjacent to the notch.

In an embodiment of the present disclosure, the handle has a cam part, an arm part, and a tail part. The arm part is connected between the cam part and the tail part, and the cam is pivotally connected to the tightening body.

In an embodiment of the present disclosure, the quick-release tube-clamp further has a blind-hole nut column and an adjustment screw assembled with each other. The blind-hole nut column is disposed on one of the wing plates, and the adjustment screw is disposed on the other one of the wing plates. A gap between the wing plates is changed by adjusting a relative position of the adjustment screw and the blind-hole nut column.

In an embodiment of the present disclosure, the quick-release tube-clamp further has a fixing shaft, and the fixing shaft penetrates the blind-hole nut column and the cam part, so that the handle is pivoted on the tightening body.

In an embodiment of the present disclosure, a groove is provided at an edge of the second tube to improve the elastic deformation at the edge of the second tube.

In an embodiment of the present disclosure, the second matching element is provided on the C-shaped tube, and the first matching element is provided on the arm part.

In an embodiment of the present disclosure, the tightening body further has an extension part away from the pair of the wing plates. The second matching member is formed at one of the extension part and the tail part, and the first matching element is provided at the other one of the second extension part and the tail part.

Based on the above, in the clamping assembly and the tube set device using the clamping assembly of the present disclosure, the handle of the quick-release tube-clamp is pivoted on the tightening body and is able to be switched pivotally between the released state and the locked state. In the released state, the first tube is telescopic relative to the second tube, and in the locked state, the tightening body clamps the first tube and the second tube tightly. This design frees the user from worries about the first tube being suddenly retracted relative to the second tube, and it has the advantage of operational simplicity.

In addition, by locking the safety screw into the lock hole, the handle is prevented from being bent open by unexpected force, so that the safety of the users is taken into account.

BRIEF DESCRIPTION OF THE DRAWING PLATES

FIG. 5B is a schematic diagram of the arm part of the clamping assembly of FIG. 5A being tightened relative to the tightening body and the first fitting member being locked in.

DESCRIPTION OF THE EMBODIMENTS

First Embodiment

Figure 1A:
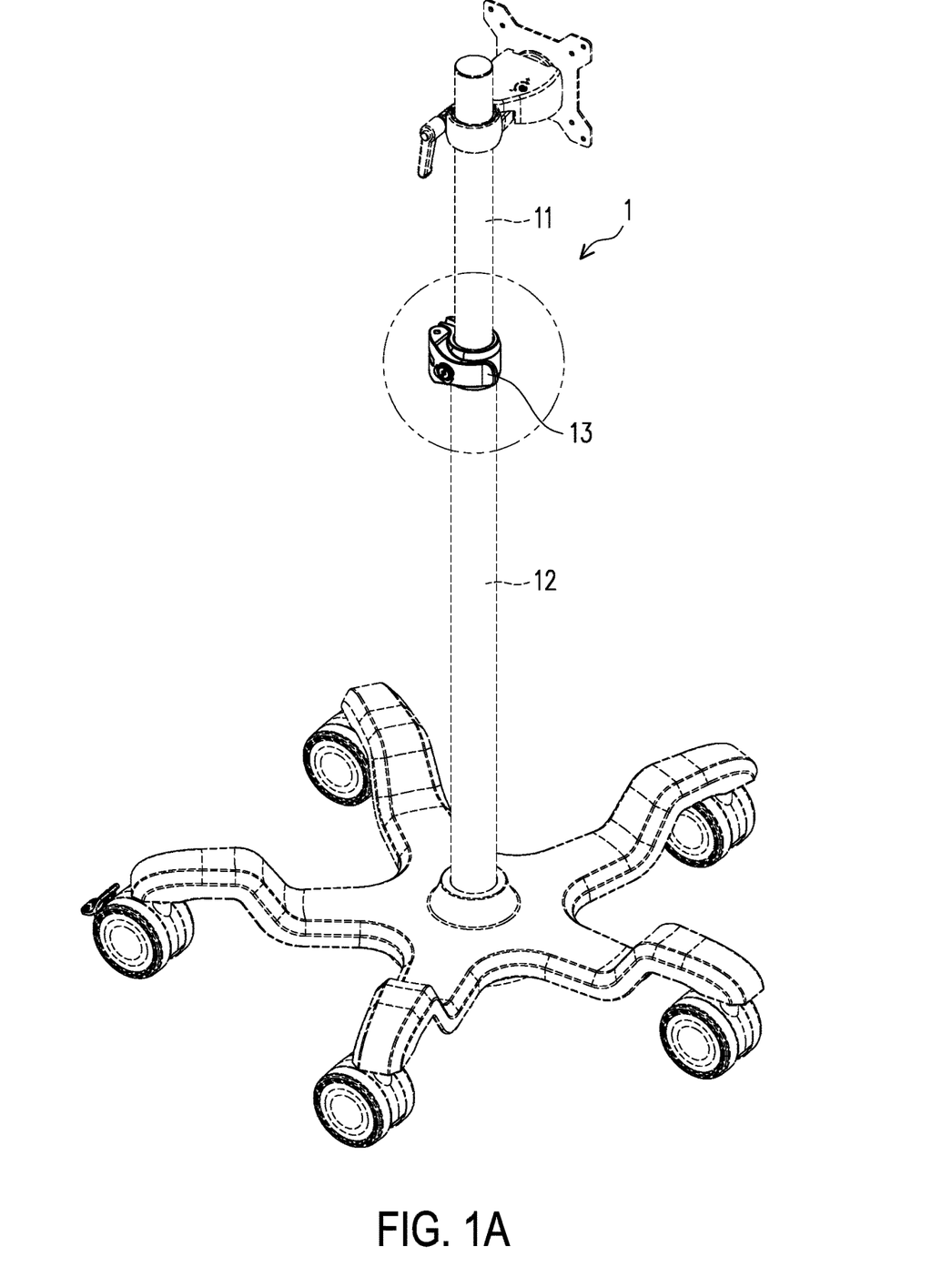
FIG. 1A is a schematic diagram of an assembled tube set device according to a first embodiment of the present disclosure.
Figure 1B:
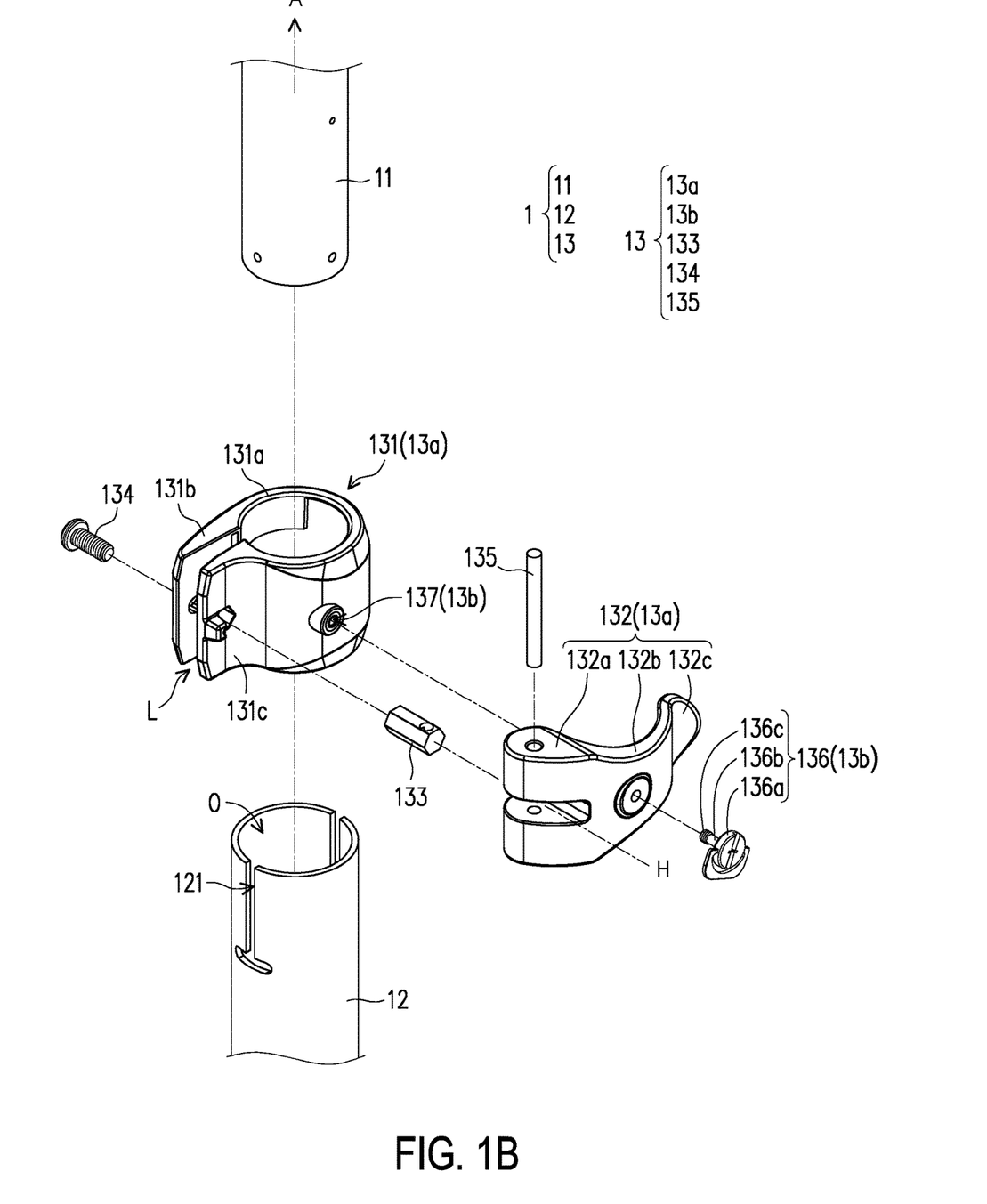
FIG. 1B is an exploded schematic view of the tube set device of FIG. 1A.
Figure 2A:
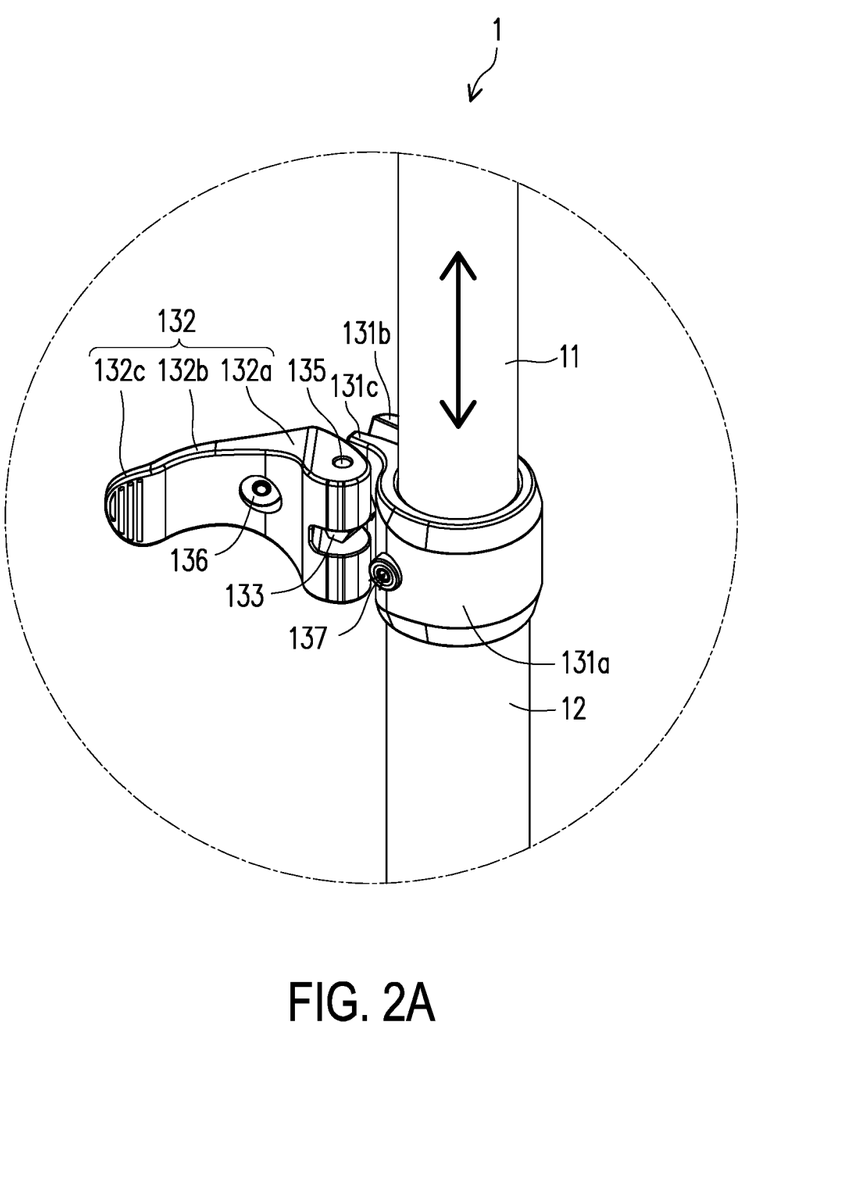
FIG. 2A to FIG. 2C are flow charts of the use of the tube set device.
Figure 2B:
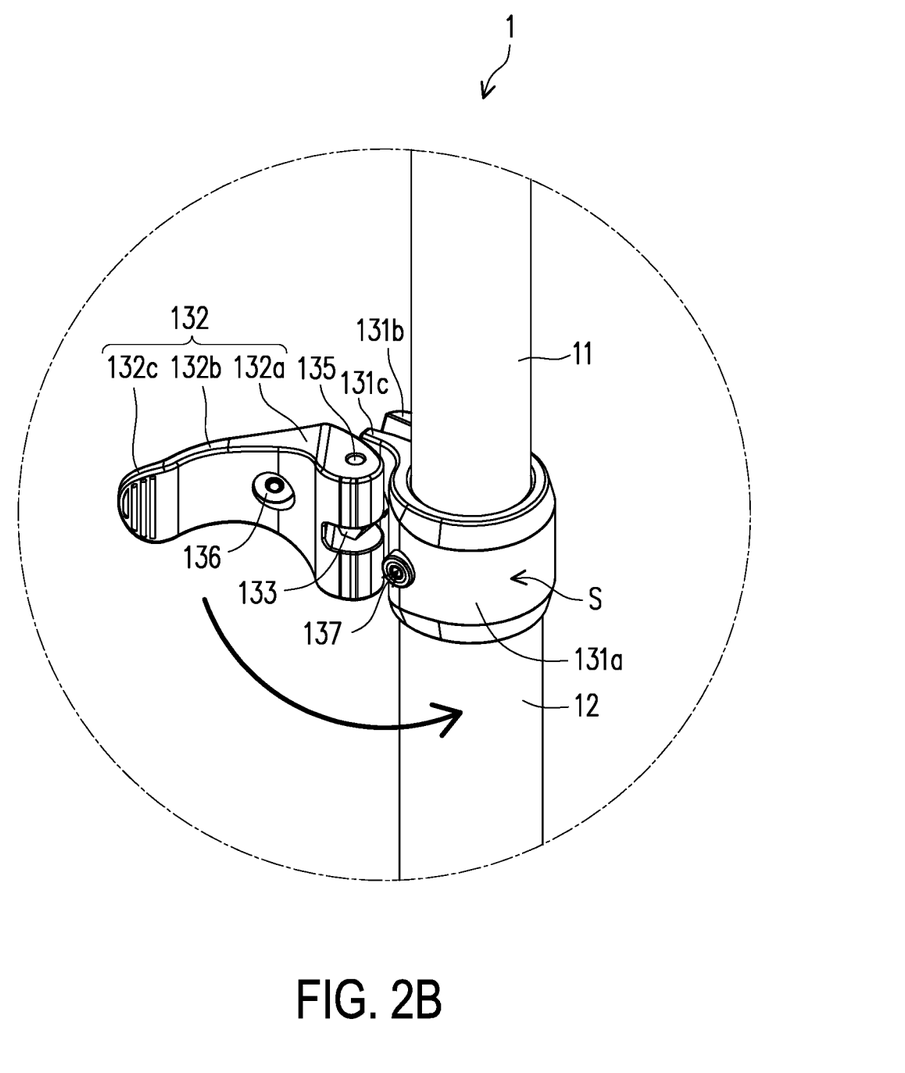
Figure 2C:
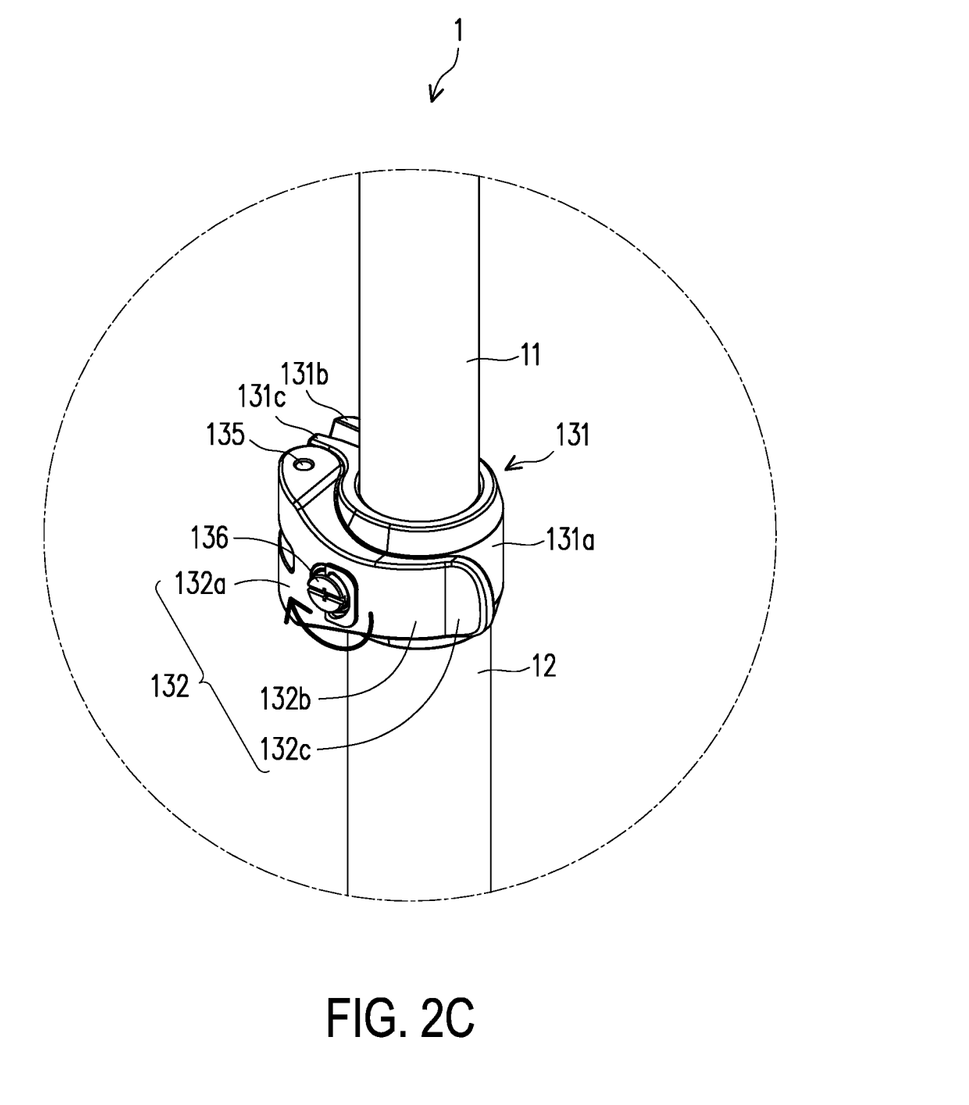
Figure 3A:
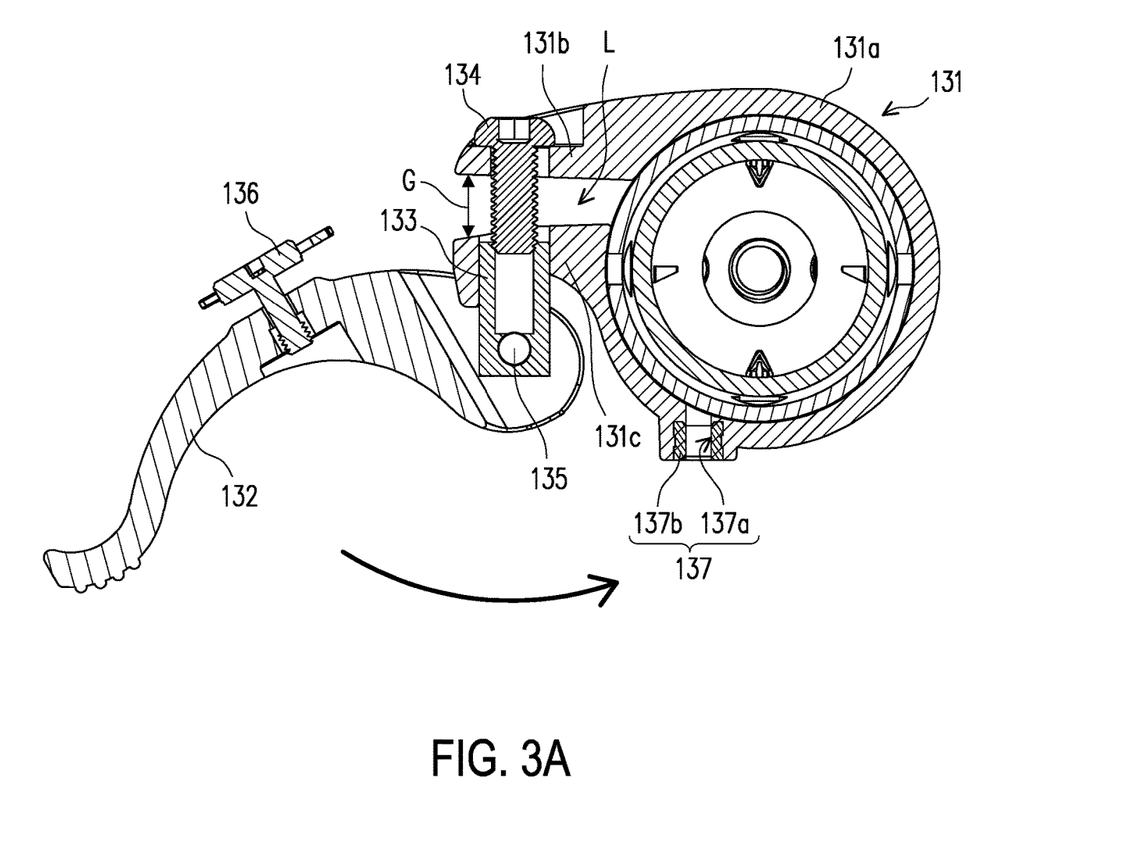
FIG. 3A to FIG. 3C are schematic cross-sectional views of the process of clamping the first tube and the second tube to each other by the clamping assembly.
Figure 3B:
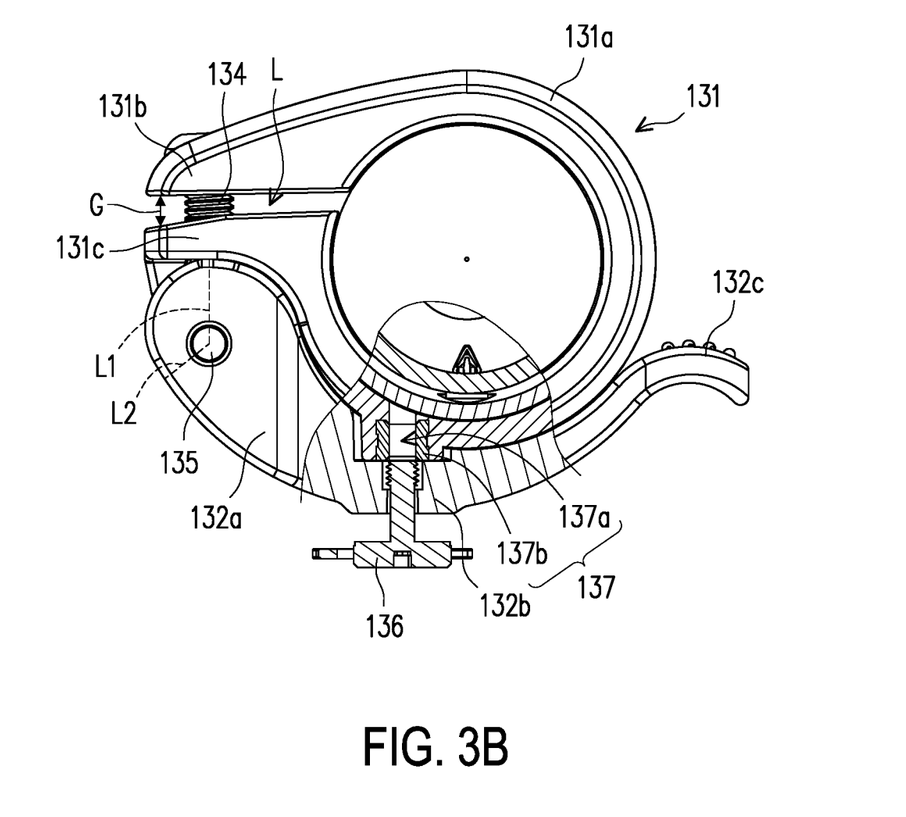
Figure 3C:
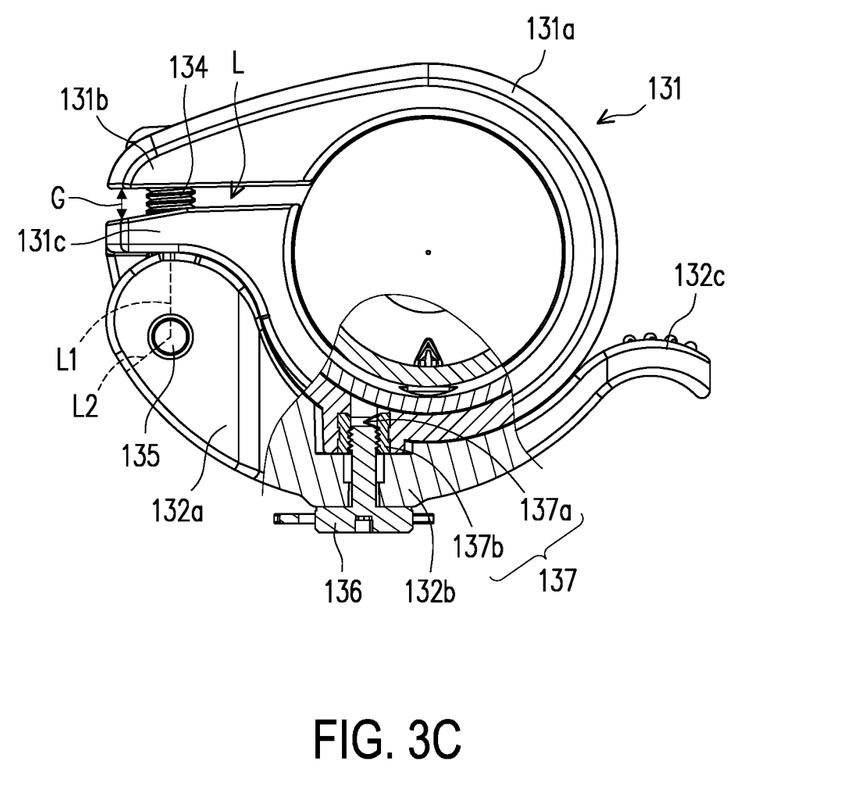

FIG. 1A is a schematic diagram of an assembled tube set device according to a first embodiment of the present disclosure, and FIG. 1B is an exploded diagram of the tube set device of FIG. 1A. FIG. 2A to FIG. 2C are diagrams showing those operational processes of the tube set device. FIG. 3A to FIG. 3C are schematic cross-sectional views of the process of clamping the first tube and the second tube to each other by the clamping assembly. Please refer to FIG. 1A and FIG. 1B at the same time.

A tube set device 1 may be used in various applications, such as a table or a chair that can be lowered and raised, or a shelf for hanging clothes. The tube set device 1 of this embodiment includes a first tube 11 and a second tube 12 that are sleeved with each other, and a clamping assembly 13. The second tube 12 includes an opening O, and the first tube 11 partially extends from the opening O into the second tube 12, and the first tube 11 is telescopic relative to the second tube 12. The clamping assembly 13 is adapted to clamp the overlap of the first tube 11 and the second tube 12 to fix the length of the first tube 11 protruding from the second tube 12. Simply put, the clamping assembly 13 is adapted to position the first tube 11 and the second tube 12 to thereby adjust the tube set device 1 to a height that is convenient for use.

In this embodiment, a groove 121 is provided at the opening O of the second tube 12. The configuration of the groove 121 increases the elastic deformability at the edge of the second tube 12, so that the second tube 12 is able to deform in response to the clamping intensity of the clamping assembly 13. This not only prevents the second tube 12 from cracking due to the damage of the structure caused by the clamping stress, but also makes the second tube 12, by being deformed, abut the first tube 11 even tightly, which improves the positioning effect.

In FIG. 1B, the groove 121 of the second tube 12 is formed by opening holes along an axial direction A of the second tube 12 from the edge, and the shape of the groove 121 is an inverted-T shape, but the shape and position of the configuration of the groove 121 are not limited to this, as long as the elastic deformation of the second tube 12 is improved.

Please continue to refer to FIG. 1A and FIG. 1B. The clamping assembly 13 is disposed at the opening O of the second tube 12 and includes a quick-release tube-clamp 13a and a safety lock unit 13b. The quick-release tube-clamp 13a includes a tightening body 131 and a handle 132. The handle 132 is pivoted on the tightening body 131 and is able to be switched pivotally between a released state (as shown in FIG. 2A) and a locked state (as shown in FIG. 2C). In the released state in FIG. 2A, the first tube 11 is telescopic relative to the second tube 12. And in the locked state, the tightening body 131 is pressed to clamp the first tube 11 and the second tube 12 so as to avoid the relative displacement of the first tube 11 and the second tube 12 as much as possible. The safety lock unit 13b includes a first matching element 136 and a second matching element 137. The first matching member 136 is disposed on one of the handle 132 and the tightening body 131, and the second matching member 137 is disposed on the other one of the handle 132 and the tightening body 131. Please refer to FIG. 1B and FIG. 2C at the same time. In the locked state, the first matching element 136 is aligned with the second matching element 137. By assembling the first matching element 136 and the second matching element 137 with each other, the handle 132 is able to be fixed to the tightening body 131 for maintaining the locked state.

The first matching member 136 is, for example, a safety screw, whereas the second matching member 137 is a lock-hole element. By screwing the safety screw into the lock-hole element, the handle 132 is fixed to the tightening body 131. Here, as shown in FIG. 1B, a safety screw is provided on the arm part 132b. When the handle 132 is close to the tightening body 131, the safety screw may be locked into the lock-hole element to fix the handle 132. This prevents the handle 132 from being forced to be bent open from the tightening body 131 by an unexpected force, which would have caused the first tube 11 to retract relative to the second tube 12.

Furthermore, the safety screw (i.e., the first matching member 136) of this embodiment has a screw head 136a, a shaft part 136b, and a thread part 136c. The shaft part 136b is connected between the screw head 136a and the thread part 136c. The outer diameter of the thread part 136c is larger than the outer diameter of the shaft part 136b, so that the safety screw (i.e., the first matching member 136) is idlingly disposed on one of the handle 132 and the tightening body 131. In this way, even when the handle 132 is bent open relative to the tightening body 131, the safety screw (i.e., the first fitting 136) does not fall off from the handle 132, which prevents the safety screw from being lost. Here, as shown in FIG. 3A, the lock-hole element (i.e., the second matching member 137) has a lock hole 137a and a nut column 137b fixed in the lock hole 137a.

Furthermore, in FIG. 1B again, in this embodiment, the tightening body 131 has a C-shaped tube 131a and a pair of wing plates 131b and 131c extending outwardly from the C-shaped tube 131a at an interval. The C-shaped tube has a notch L, and the pair of the wing plates 131b and 131c are correspondingly adjacent to the notch L. Here, the lock-hole element (i.e., the second fitting member 137) is provided on the C-shaped tube 131a. The shape of the handle 132 is roughly an arc-shaped plate, and has a cam part 132a, an arm part 132b, and a tail part 132c. The arm part 132b is connected between the cam part 132a and the tail part 132c, and the cam part 132a is relatively pivotally connected to the tightening body 131. Here, the safety screw (i.e., the first fitting 136) is provided on the arm part 132b. The tail part 132c is located relatively closer to the user, so that the user may push the tail part 132c to rotate the handle 132 relative to the tightening body 131 so that the tail part 132c rotates closer to or rotates away from the tightening body 131.

Furthermore, the quick-release tube-clamp 13a of this embodiment further has a blind-hole nut column 133 and an adjustment screw 134 that are assembled with each other. The blind-hole nut column 133 is disposed on one of the wing plates 131b and 131c, and the adjustment screw 134 is disposed on the other one of the wing plates 131b and 131c. A gap G between the pair of the wing plates 131b and 131c may be changed by adjusting the relative position of the adjustment screw 134 and the blind-hole nut column 133. The blind-hole nut column 133 passes through one of the wing plates, the wing plate 131c, along a horizontal direction H and is fixed to the cam part 132a. The adjustment screw 134 passes through the other wing plate, the wing plate 131b, and is locked into the blind-hole nut column 133. The gap G between the pair of the wing plates 131b and 131c (please refer to FIG. 3A) may be changed by adjusting the depth of the adjustment screw 134 locked into the blind-hole nut column 133, which may further adjust the force of the C-shaped tube 131a pressing the second tube 12.

In addition, the quick-release tube-clamp 13a of this embodiment further has a fixing shaft 135. The fixing shaft 135 penetrates the cam part 132a and the blind-hole nut column 133 along a gravity direction, so that the handle 132 is pivoted on the tightening body 131 through the blind-hole nut column 133 and the fixing shaft 135. Simply put, the handle 132 is able to rotate relative to the tightening body 131 with the fixing shaft 135 as the rotation axis. In this embodiment, the fixing shaft 135 is a spring pin, which assembles the blind-hole nut column 133 and the handle 132 well.

Next, in FIG. 2A, when the handle 132 is bent open relative to the tightening body 131 (that is, in the released state), the clamping assembly 13 does not exert a tightening force on the first tube 11 and the second tube 12 at this time, so that it is convenient for the user to adjust the length of the first tube 11 protruding from the second tube 12.

Then, as shown in FIG. 2B and FIG. 3A, with the fixing shaft 135 as the rotation axis, the tail part 132c of the handle 132 is moved, making the handle 132 rotate with the fixing shaft 135 as the rotation axis to be relatively closer to the tightening body 131 (that is, the locked state) as shown in FIG. 3B.

In particular, when the handle 132 uses the fixing shaft 135 as the rotation axis to get close to the tightening body 131, since different parts of the cam part 132a have different diameters L1 and L2 (please refer to FIG. 3B), as the cam part 132a rotates, the cam part 132a presses one wing plate 131b to approach the other wing plate 131c, making the gap G between the pair of the wing plates 131b and 131c smaller, which in turn deforms the C-shaped tube 131a to squeeze the second tube 12 for tightening the first tube 11.

Incidentally, it can be seen from FIG. 3B that the tail part 132c of the handle 132 protrudes from the C-shaped tube 131a. Therefore, it is very likely that the handle 132 is moved accidentally, which bends open the handle 132 that was relatively to the tightening body 131.

Then please refer to FIG. 2C and FIG. 3C. In the present disclosure of the disclosure, in order to prevent the handle 132 from being moved accidentally, a safety screw (that is, the first matching element 136) is provided at the arm part 132b of the handle 132, and a corresponding lock-hole element (i.e., the second matching element 137) is provided on the C-shaped tube 131a. After the handle 132 is rotated close to the tightening body 131 to locate the first tube 11 and the second tube 12, the safety screw (that is, the first matching element 136) may be screwed into the lock hole (that is, the second matching element 137) In the lock hole 137a. In this way, the handle 132 is fixed in a state of being kept pressed against the tightening body 131.

If the user wants to adjust the protruding length of the first tube 11 relative to the second tube 12 again, the safety screw (that is, the first matching element 136) may be loosened to disengage the lock-hole element (that is, the second matching element 137). Then, by bending the handle 132 open relative to the tightening body 131, the protruding length of the first tube 11 relative to the second tube 12 may be adjusted again easily.

It can be seen from the above that the tube set device 1 of the present disclosure is capable of positioning the first tube 11 and the second tube 12 by simply rotating the handle 132. In addition, the configuration of the first matching element 136 (such as a safety screw) and the second matching element 137 (such as a lock-hole element) may further prevent the handle 132 from being bent open relative to the tightening body 131 in an unexpected scenario to keep the first tube 11 and the second tube 12 positioned firmly.

Second Embodiment

This embodiment is substantially the same and achieves the same effect as the above embodiment; nevertheless, the difference between the two is that the position of the first matching element and the second matching element are changed based on the design.

Figure 4:
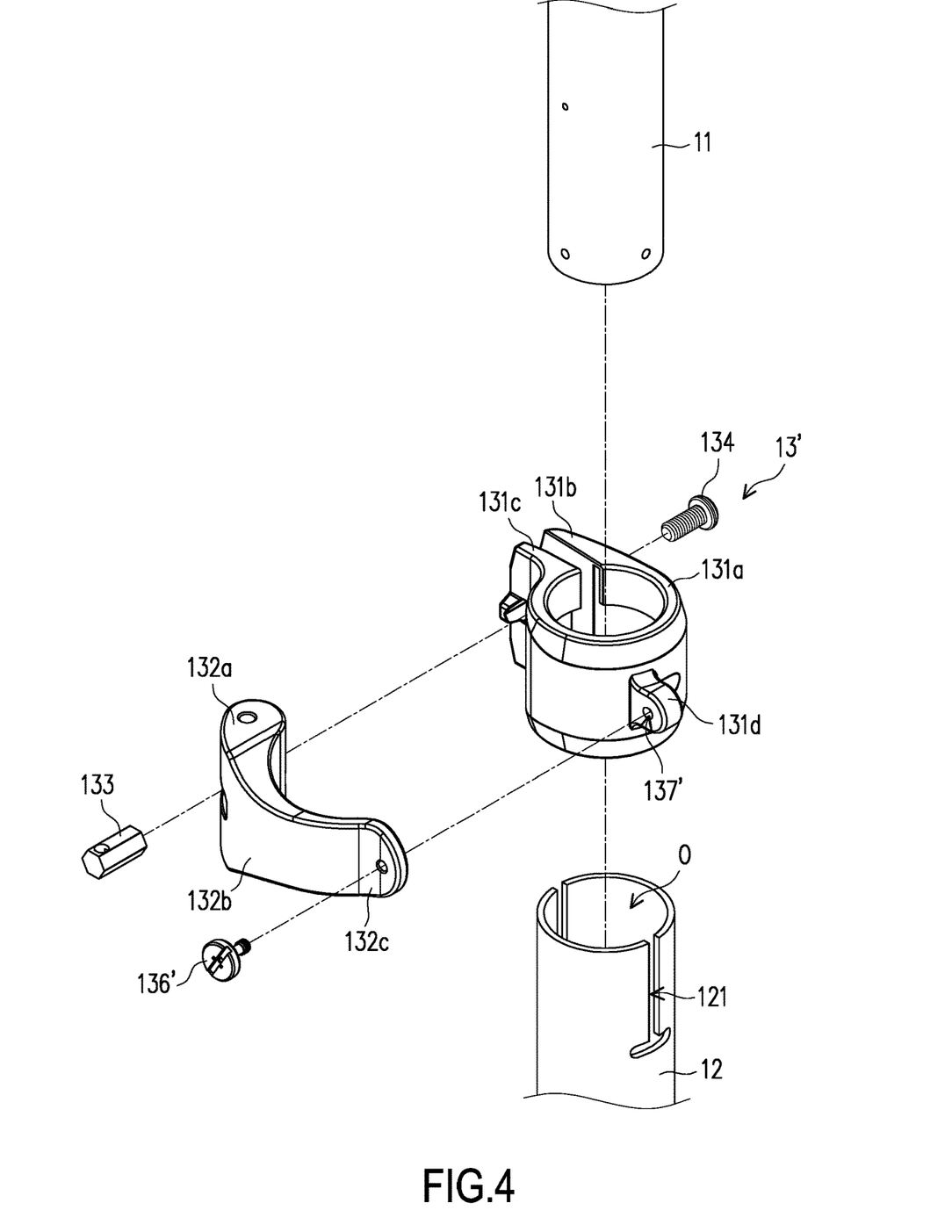
FIG. 4 is an exploded schematic diagram of a tube set device according to a second embodiment of the present disclosure.
Figure 5A:
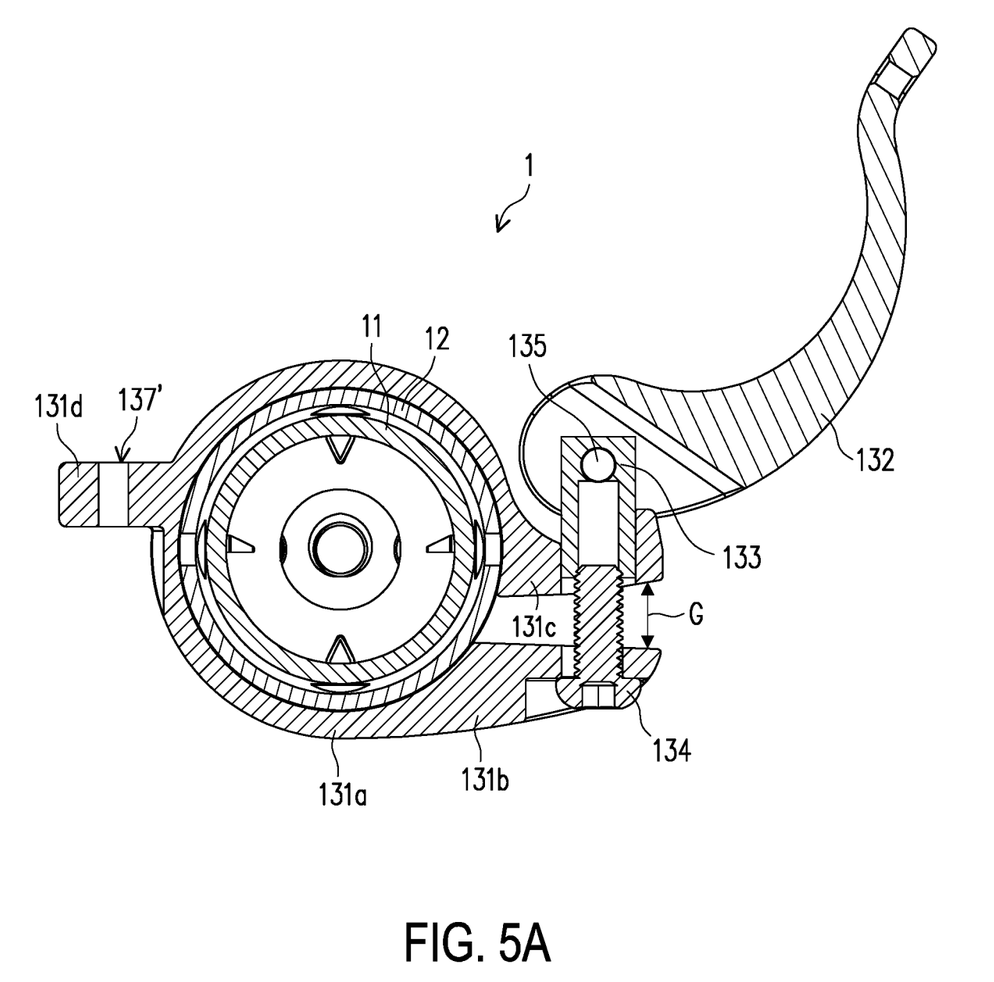
FIG. 5A is a schematic diagram of an arm part of the clamping assembly being bent open relative to the tightening body.
Figure 5B:
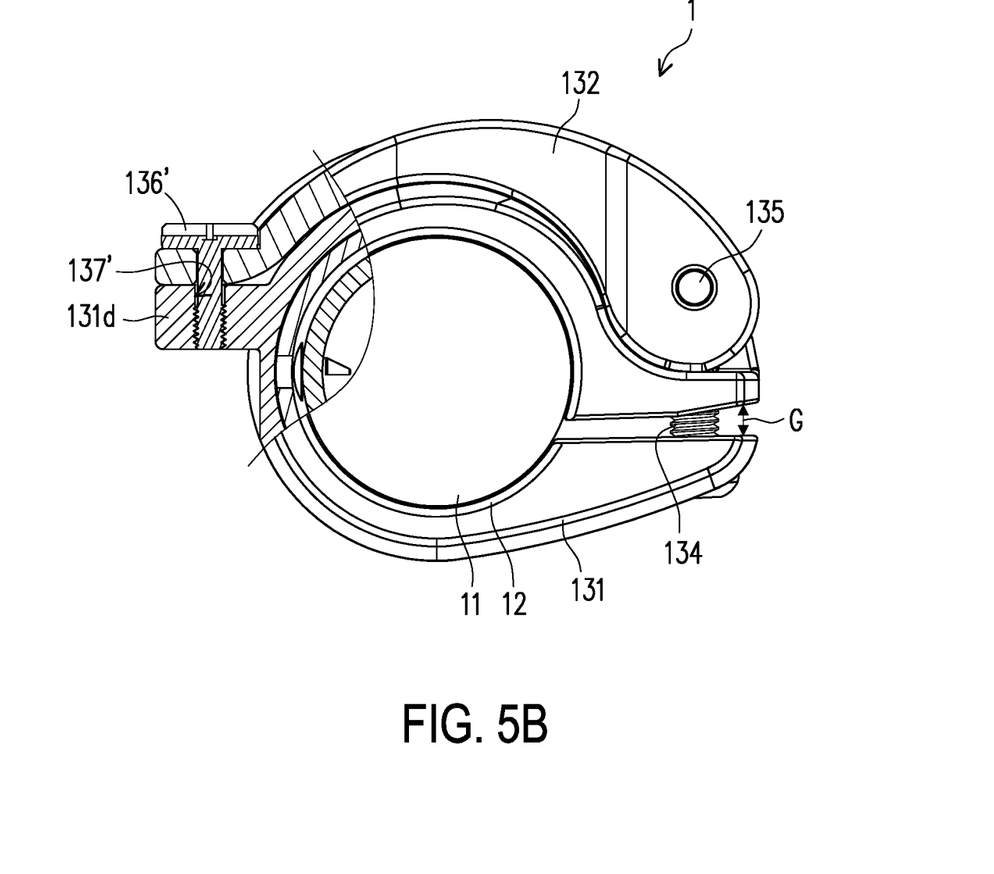
Figure 6:
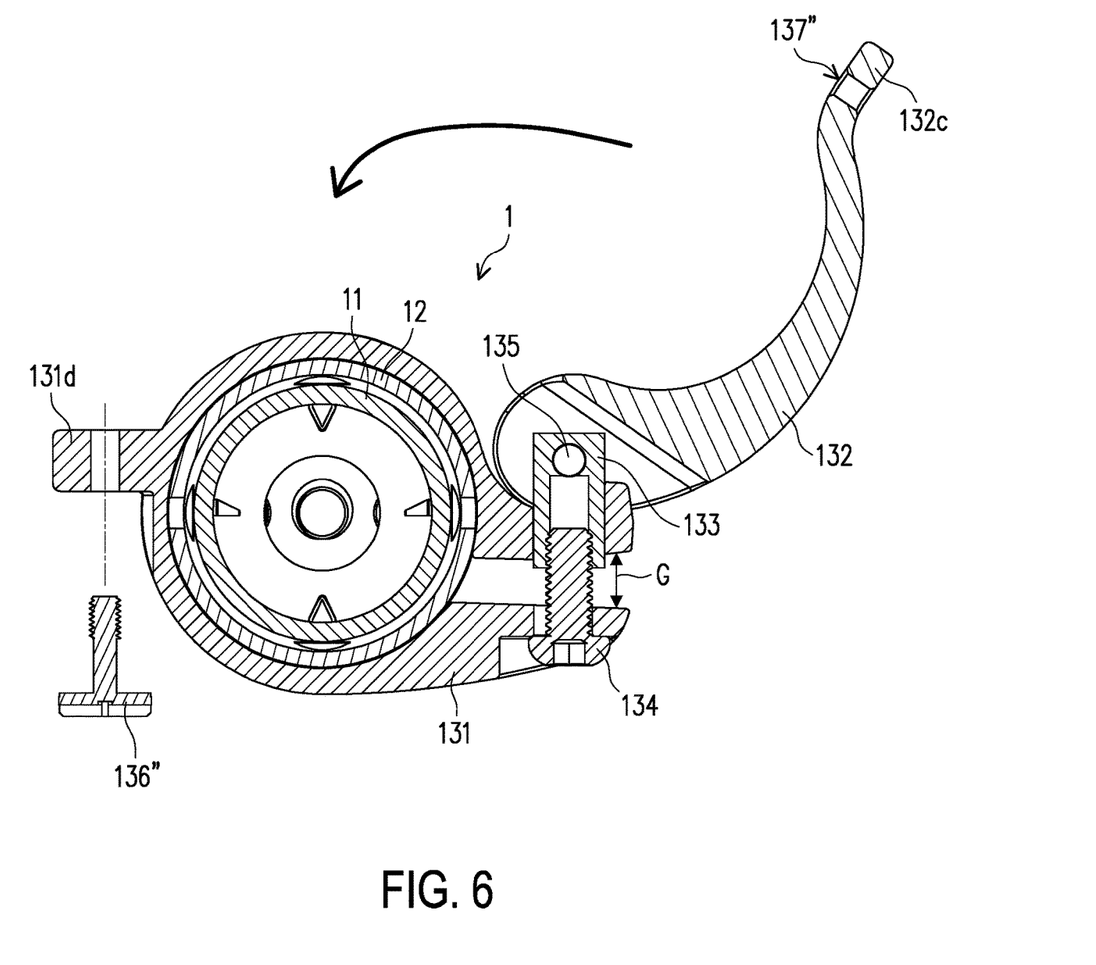
FIG. 6 is a schematic diagram of a first fitting part being disposed on a second extension part and a lock hole being disposed at a tail part.

FIG. 4 is an exploded schematic diagram of a tube set device according to a second embodiment of the present disclosure. FIG. 5A is a schematic diagram of an arm part of the clamping assembly being bent open relative to the tightening body. FIG. 5B is a schematic diagram of the arm part of the clamping assembly of FIG. 5A being tightened relative to the tightening body and the first fitting member being locked in. FIG. 6 is a schematic diagram of a first fitting part being disposed on a second extension part and a lock hole being disposed at a tail part.

In the aforementioned first embodiment, the second matching element 137 (i.e., the lock-hole element) is provided on the C-shaped tube 131a of the tightening body 131, and the first matching element 136 (i.e., the safety screw) is provided on the arm part 132b of the handle 132. By comparison, in this embodiment, a second matching member 137' (that is, the lock-hole element) is disposed on the tightening body 131, and a first matching member 136' (that is, the safety screw) is disposed on the handle 132.

Specifically speaking, the tightening body 131 also has an extension part 131d extending from a C-shaped tube 131a, and a pair of wing plates 131b and 131c and the extension part 131d are disposed on opposite sides of the C-shaped tube 131a along a radial direction of the C-shaped tube 131a. The pair of the wing plates 131b and 131c and the extension part 131d extend in different directions in the radial direction. The second matching element 137' (i.e., the lock-hole element) is formed on the extension part 131d, and the first matching element 136' (i.e., the safety screw) is provided on the tail part 132c of the handle 132.

Please refer to FIG. 5A and FIG. 5B at the same time. It can be seen that even if the positions of the first matching element 136' (i.e., the safety screw) and the second matching element 137' (i.e., the lock-hole element) are changed, it still achieves the purpose of making the clamping assembly 13' clamp and position the first tube 11 and the second tube 12 and preventing the handle 132 from being bent open relatively to the tightening body 131 in an unexpected scenario.

As shown in FIG. 6, a first matching member 136" (i.e., the safety screw) may also be provided on the extension part 131d, whereas the second matching member 137' (i.e., the lock-hole element) is provided on the tail part 132c of the handle 132. This configuration may also achieve the same purpose as the above.

Figure 7A:
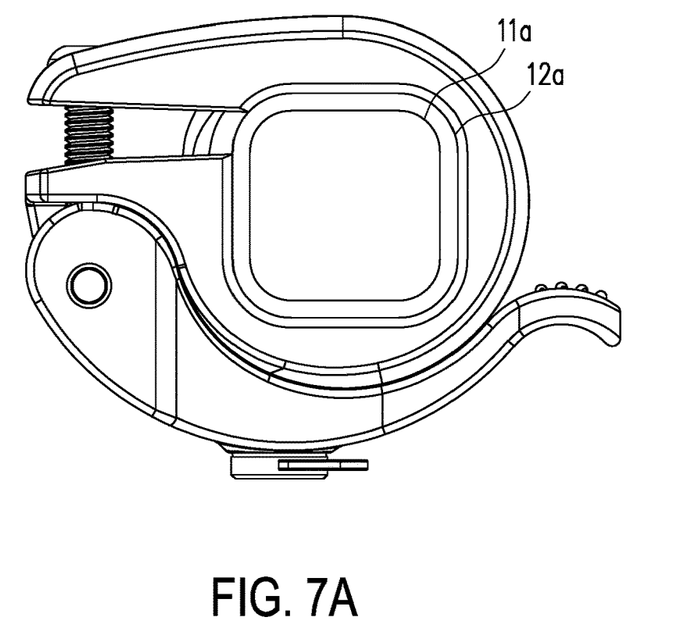
FIG. 7A and FIG. 7B are schematic diagrams of the cross-sectional shapes of the first tube and the second tube in other embodiments.
Figure 7B:
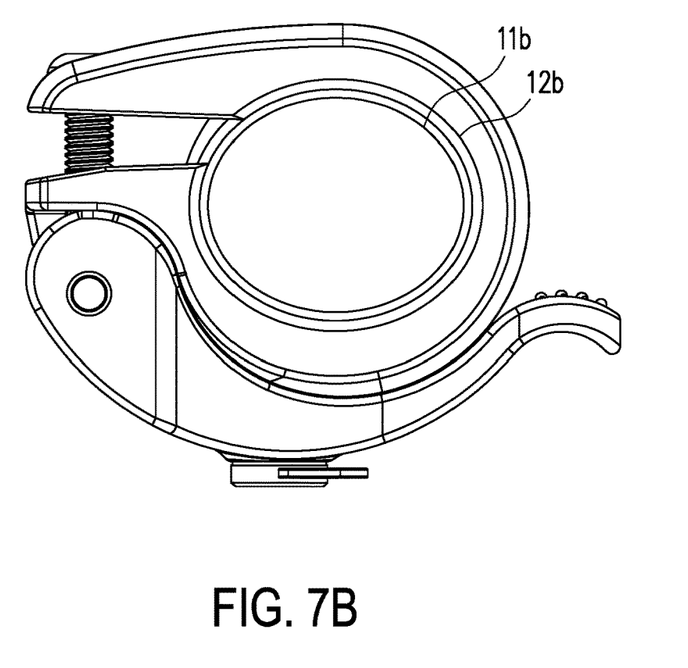

FIG. 7A and FIG. 7B are schematic diagrams of the cross-sectional shapes of the first tube and the second tube in other embodiments. In the above embodiments, the cross-sectional shapes of the first tube 11 and the second tube 12 are circular, and the outer diameter of the first tube 11 is smaller than or equal to the inner diameter of the second tube 12. However, in other embodiments, as shown in FIG. 7A and FIG. 7B, the cross-sectional shapes of the first tubes 11a and 11b and the second tubes 12a and 12b are not limited to circles, and may be rectangular or elliptical.

In summary, the tube set device and the clamping assembly of the present disclosure are able to position the first tube and the second tube through a simple rotation of the handle, so the present disclosure has the advantage of operational simplicity.

In addition, the configuration of the first matching element (such as a safety screw) and the second matching element (such as a lock-hole element) may also prevent the handle from being bent open relative to the tightening body in an unexpected scenario, keeping the first tube and the second tube in a stable position, which is safe for the users to use.

What is claimed is:

1. A tube set device, comprising:
a first tube and a second tube sleeved with each other, wherein the second tube comprises an opening, the first tube partially extends from the opening into the second tube, and the first tube is telescopic relative to the second tube; and
a clamping assembly, disposed at the opening of the second tube, and the clamping assembly comprising:
a quick-release tube-clamp, comprising a tightening body and a handle, wherein the handle is pivoted on the tightening body and is able to be switched pivotally between a released state and a locked state, and wherein, in the released state, the first tube is telescopic relative to the second tube, and in the locked state, the tightening body clamps the first tube and the second tube tightly; and
a safety lock unit, comprising a first matching element and a second matching element, wherein the first matching element is disposed on one of the handle and the tightening body, and the second matching element is disposed on the other one of the handle and the tightening body,
wherein, in the locked state, the first matching element is aligned with the second matching element, and the first matching element and the second matching element are able to be assembled with each other for fixing the handle to the tightening body and maintaining the locked state,
wherein the first matching element is a safety screw, the second matching element is a lock-hole element, and the handle is fixed to the tightening body by screwing the safety screw into the lock-hole element,
wherein a matching of the safety screw and lock-hole element becomes tighter when screwing the safety screw into the lock-hole element in a first rotation direction,
and the matching of the safety screw and lock-hole element becomes looser when screwing the safety screw out of the lock-hole element in an opposite direction of first rotation,
wherein the first matching element comprises a screw head, a shaft part, and a thread part; the shaft part is connected between the screw head and the thread part; and an outer diameter of the thread part is larger than an outer diameter of the shaft part, whereby the first matching member is idlingly disposed on one of the handle and the tightening body,
wherein the second matching member comprises a lock hole and a nut column fixed in the lock hole,
wherein the tightening body comprises a C-shaped tube sleeved on the second tube and a pair of wing plates extending outwardly from the C-shaped tube at an interval, and wherein the C-shaped tube has a notch, and the wing plates are correspondingly adjacent to the notch,
wherein the handle comprises a cam part, an arm part, and a tail part, wherein the arm part is connected between the cam part and the tail part, and the cam part is pivotally connected to the tightening body about a fastener extending between the pair of wings, the cam part clamping the pair of wings toward each other in the locked state.

2. The tube set device according to claim 1, wherein the quick-release tube-clamp further comprises a blind-hole nut column and an adjustment screw assembled with each other, the blind-hole nut column is disposed on one of the wing plates, the adjustment screw is disposed on the other one of the wing plates, and a gap between the wing plates is changed by adjusting a relative position of the adjustment screw and the blind-hole nut column.

3. The tube set device according to claim 2, wherein the quick-release tube-clamp further comprises a fixing shaft, and the fixing shaft penetrates the blind-hole nut column and the cam part, so that the handle is pivoted on the tightening body.

4. The tube set device according to claim 3, wherein a groove is provided at an edge of the second tube to improve elastic deformation at the edge of the second tube.

5. The tube set device according to claim 1, wherein the second matching element is provided on the C-shaped tube, and the first matching element is provided on the arm part.

6. The tube set device according to claim 1, wherein the tightening body further comprises an extension part away from the wing plates, the second matching element is formed at one of the extension part and the tail part, and the first matching element is provided at the other one of the extension part and the tail part.

7. A clamping assembly adapted for a first tube and a second tube sleeved with each other, the second tube comprising an opening, the first tube partially extending from the opening into the second tube, the first tube being telescopic relative to the second tube, the clamping assembly disposed at the opening of the second tube, and the clamping assembly comprising:
  a quick-release tube-clamp, comprising a tightening body and a handle, wherein the handle is pivoted on the tightening body and is able to be switched pivotally between a released state and a locked state; and wherein, in the released state, the first tube is telescopic relative to the second tube, and in the locked state, the tightening body clamps the first tube and the second tube tightly; and
  a safety lock unit, comprising a first matching element and a second matching element, wherein the first matching element is disposed on one of the handle and the tightening body, and the second matching element is disposed on the other one of the handle and the tightening body,
    wherein, in the locked state, the first matching element is aligned with the second matching element, and the first matching element and the second matching element are able to be assembled with each other for fixing the handle to the tightening body and maintaining the locked state,
  wherein the first matching element is a safety screw, the second matching element is a lock-hole element, and the handle is fixed to the tightening body by screwing the safety screw into the lock-hole element,
  wherein a matching of the safety screw and lock-hole element becomes tighter when screwing the safety screw into the lock-hole element in a first rotation direction,
  and the matching of the safety screw and lock-hole element becomes looser when screwing the safety screw out of the lock-hole element in an opposite direction of first rotation,
  wherein the first matching element comprises a screw head, a shaft part, and a thread part; the shaft part is connected between the screw head and the thread part; and an outer diameter of the thread part is larger than an outer diameter of the shaft part, whereby the first matching member is idlingly disposed on one of the handle and the tightening body,
  wherein the second matching member comprises a lock hole and a nut column fixed in the lock hole,
  wherein the tightening body comprises a C-shaped tube sleeved on the second tube and a pair of wing plates extending outwardly from the C-shaped tube at an interval, and wherein the C-shaped tube has a notch, and the wing plates are correspondingly adjacent to the notch,
  wherein the handle comprises a cam part, an arm part, and a tail part, wherein the arm part is connected between the cam part and the tail part, and the cam part is pivotally connected to the tightening body about a fastener extending between the pair of wings, the cam part clamping the pair of wings toward each other in the locked state.

8. The clamping assembly according to claim 7, wherein the quick-release tube-clamp further comprises a blind-hole nut column and an adjustment screw assembled with each other, the blind-hole nut column is disposed on one of the wing plates, the adjustment screw is disposed on the other of the wing plates, and a gap between the wing plates is changed by adjusting a relative position of the adjustment screw and the blind-hole nut column.

9. The clamping assembly according to claim 8, wherein the quick-release tube-clamp further comprises a fixing shaft, the fixing shaft penetrates the blind-hole nut column and the cam part, so that the handle is pivoted on the tightening body.

10. The clamping assembly according to claim 7, wherein the second matching member is provided on the C-shaped tube, and the first matching member is provided on the arm part.

11. The clamping assembly according to claim 7, wherein the tightening body further comprises an extension part away from the wing plates, the second matching element is formed at one of the extension part and the tail part, and the first matching element is provided at the other one of the extension part and the tail part.

* * * * *